(12) United States Patent
Lee

(10) Patent No.: US 10,183,711 B2
(45) Date of Patent: Jan. 22, 2019

(54) AMPHIBIOUS CATERPILLAR TRACK SHOE

(71) Applicant: Chung Chul Lee, Busan (KR)

(72) Inventor: Chung Chul Lee, Busan (KR)

( * ) Notice: Subject to any disclaimer, the term of this patent is extended or adjusted under 35 U.S.C. 154(b) by 0 days.

(21) Appl. No.: 15/578,936

(22) PCT Filed: Jun. 1, 2016

(86) PCT No.: PCT/KR2016/005780
§ 371 (c)(1),
(2) Date: Dec. 1, 2017

(87) PCT Pub. No.: WO2016/195365
PCT Pub. Date: Dec. 8, 2016

(65) Prior Publication Data
US 2018/0170465 A1    Jun. 21, 2018

(30) Foreign Application Priority Data

Jun. 2, 2015  (KR) .................. 10-2015-0077768

(51) Int. Cl.
*B62D 55/26* (2006.01)
*B60F 3/00* (2006.01)
*B62D 55/20* (2006.01)

(52) U.S. Cl.
CPC .............. *B62D 55/26* (2013.01); *B60F 3/00* (2013.01); *B60F 3/0015* (2013.01); *B62D 55/20* (2013.01)

(58) Field of Classification Search
CPC ....... B62D 55/26; B62D 55/20; B60F 3/0015; B60F 3/00
USPC ........ 305/185, 196, 198, 200, 201, 202, 203
See application file for complete search history.

(56) References Cited

U.S. PATENT DOCUMENTS

| 4,433,634 | A  | * | 2/1984  | Coast ................. | B60F 3/0061 |
|           |    |   |         |                        | 180/9.1 |
| 5,839,802 | A  | * | 11/1998 | Sheets ................. | B60F 3/0015 |
|           |    |   |         |                        | 305/52 |
| 7,670,200 | B2 | * | 3/2010  | Wilson ................. | B60F 3/0015 |
|           |    |   |         |                        | 440/12.5 |
| 2002/0155765 | A1 |  | 10/2002 | Morin |  |
| 2003/0090151 | A1 |  | 5/2003  | Takeno et al. |  |
| 2004/0239182 | A1 | * | 12/2004 | Lee ..................... | B60F 3/0015 |
|           |    |   |         |                        | 305/192 |
| 2005/0003715 | A1 | * | 1/2005  | Hewitt ................ | B60F 3/0015 |
|           |    |   |         |                        | 440/12.5 |

(Continued)

FOREIGN PATENT DOCUMENTS

KR       10-0396213 B1     8/2003
KR    10-2011-0026869 A    3/2011
(Continued)

OTHER PUBLICATIONS

International Search Report for PCT/KR2016/005780 dated Aug. 30, 2016 from Korean Intellectual Property Office.

*Primary Examiner* — S. Joseph Morano
*Assistant Examiner* — Jean W Charleston
(74) *Attorney, Agent, or Firm* — Paratus Law Group, PLLC

(57) ABSTRACT

The present invention provides an amphibious caterpillar track shoe, which has a novel structure and has greater buoyancy while increasing the durability of the track shoe by means of a foam buoyant member and a fixing frame, and has webbed protruding parts capable of improving the movement speed of a track vehicle on water.

4 Claims, 7 Drawing Sheets

(56) References Cited

U.S. PATENT DOCUMENTS

2009/0072618 A1    3/2009  Bordini

FOREIGN PATENT DOCUMENTS

KR        10-1034352 B1    5/2011
KR    10-2013-0113016 A    10/2013

* cited by examiner

AMPHIBIOUS CATERPILLAR TRACK SHOE

CROSS REFERENCE TO PRIOR APPLICATIONS

This application is a National Stage Patent Application of PCT International Patent Application No. PCT/KR2016/005780 (filed on Jun. 1, 2016) under 35 U.S.C. § 371, which claims priority to Korean Patent Application No. 10-2015-0077768 (filed on Jun. 2, 2015), which are all hereby incorporated by reference in their entirety.

TECHNICAL FIELD

The present invention relates to an amphibious caterpillar track shoe.

BACKGROUND ART

The present inventors have proposed a track shoe for an amphibious caterpillar recreational vehicle disclosed in Korean Registered patent No. 10-0396213 (registered on Aug. 18, 2003) and a caterpillar track shoe disclosed in Korean Registered Patent No. 10-1034352 (registered on May 3, 2011).

The present invention is proposed to improve the above related art.

Conventionally, a tracked vehicle has a caterpillar structure in which a plurality of amphibious caterpillar track shoes is connected in a chain connection, so that the tracked vehicle is moved in the same direction as the moving direction of the caterpillar structure.

As illustrated in FIG. 1, a conventional track shoe includes a hollow buoyant plastic section 100a and 100b to enable a tracked vehicle to move on water, and a foam pad 200 provided on a lower portion of a first buoyant part 100a to absorb shocks generated with respect to the ground to facilitate the movement on land.

Such track shoes are chain-connected to foam a caterpillar 500 illustrated in FIG. 2.

However, the conventional hollow buoyant plastic section 100a and 100b has problems in that it may be easily deformed by external shocks during the movement on land, and that water may be infiltrated into the buoyant plastic section 100a and 100b.

Accordingly, there is a need to provide a track shoe structure capable of being buoyant while being protected from external shocks.

Further, there is a further need to provide a track shoe allowing a tracked vehicle to secure a greater advancing force with the same driving force during the movement on water, i.e. to secure a greater force to make head against water.

DISCLOSURE

Technical Problem

Accordingly, the present invention has been made keeping in mind the above problems occurring in the related art, and an object of the present invention is to provide an amphibious caterpillar track shoe, which has a novel structure and can generate greater buoyancy while increasing the durability of the track shoe by means of a buoyant foam section and a fixing frame, and has webbed protruding parts capable of improving the movement speed of a track vehicle on water.

Technical Solution

In order to accomplish the above object, the present invention provides an amphibious caterpillar track shoe including: a first buoyant section having a hexahedral buoyant foam body with a wide width and a short length, the first buoyant section having pad-coupling recesses in an upper surface, a lower surface, and opposite sides thereof; a first fixing frame provided in close contact with front, rear, and bottom surfaces of the first buoyant section to fix the first buoyant section, wherein a width thereof is smaller than that of the first buoyant section; a foam pad having a rectangular ring-type coupling part fixedly inserted into the pad-coupling recess of the first buoyant section, a bottom plate part formed at a lower portion of the coupling part, and a webbed protruding part formed downwards on an undersurface of the bottom plate part, extending in a width direction of the bottom plate part; a connection plate provided on the upper surface of the first buoyant section and having on front and rear surfaces thereof connection brackets to couple an adjacent connection plate, wherein a width thereof is smaller than that of the first buoyant section, and a longitudinal length thereof corresponds to that of the first buoyant section; a second buoyant section provided on an upper surface of the connection plate and having a hexahedral buoyant foam body, wherein a width thereof is smaller than that of the first buoyant section; a second fixing frame provided to fix the second buoyant section and having a pair of fixing side plate parts closely contacting and covering the opposite sides of the second buoyant section, and a connection part connecting the pair of fixing side plate parts, wherein the second fixing frame is provided with front and rear openings through which the front and rear surfaces of the second buoyant section are exposed to the outside, respectively; and a fastening member fastening the first and second fixing frames to the connection plate.

A first support plate nay be provided on an upper portion of the first fixing frame, a second support plate may be provided on a lower portion of the second fixing frame, the fastening member nay fasten the first and second fixing frames to the connection plate through the second support plate, the connection plate, and the first support plate, and the second fixing frame may be provided with an upper opening through which an upper surface of the second buoyant section is exposed to the outside.

The second fixing frame may be provided with a fixing upper plate to cover an upper surface of the second buoyant section, and the fastening member may fasten the first and second fixing frames to the connection plate through an upper surface of the fixing upper plate of the second fixing frame, the connection plate, and a lower surface of the first fixing frame.

The bottom plate part of the foam pad may be further provided with a protruding rib formed downwards on the undersurface of the bottom plate part, extending perpendicular to the webbed protruding part.

Advantageous Effects

As described above, the present invention provides the buoyant foam section and the fixing frame to increase the durability of the track shoe, thereby providing the protection of the track shoe from external shocks as well as preventing a reduction in buoyancy of the track shoe generated due to infiltration of water.

Further, due to the provision of the buoyant foam section and the fixing frame and the unique structure of the fixing frame, the track shoe can be fabricated in lighter weight, thereby being more buoyant.

Still further, the provision of the webbed protruding parts formed on the lower surface of the foam pad can provide the faster moving speed to the tracked vehicle moving on water, even in the same power condition.

BEST MODE

Figure 1:
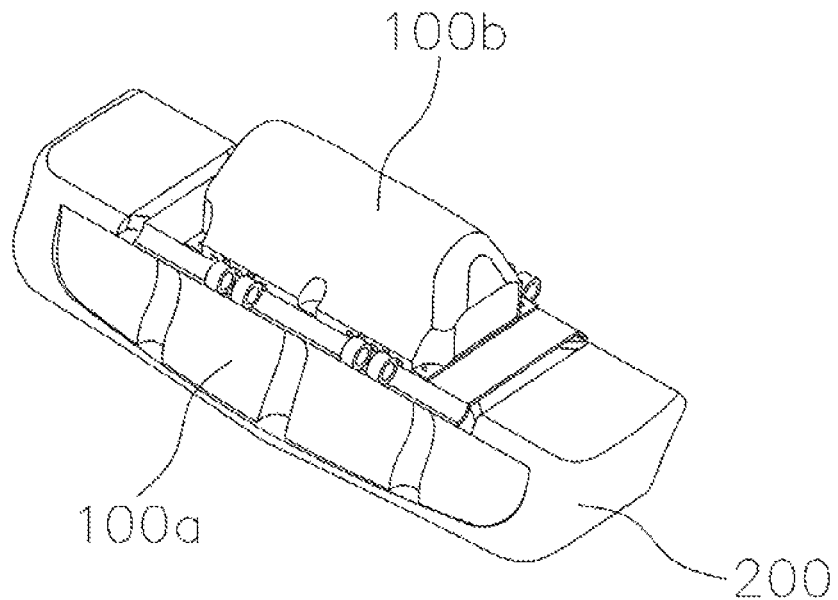
FIG. 1 is a perspective view of a conventional amphibious caterpillar track shoe.
Figure 2:
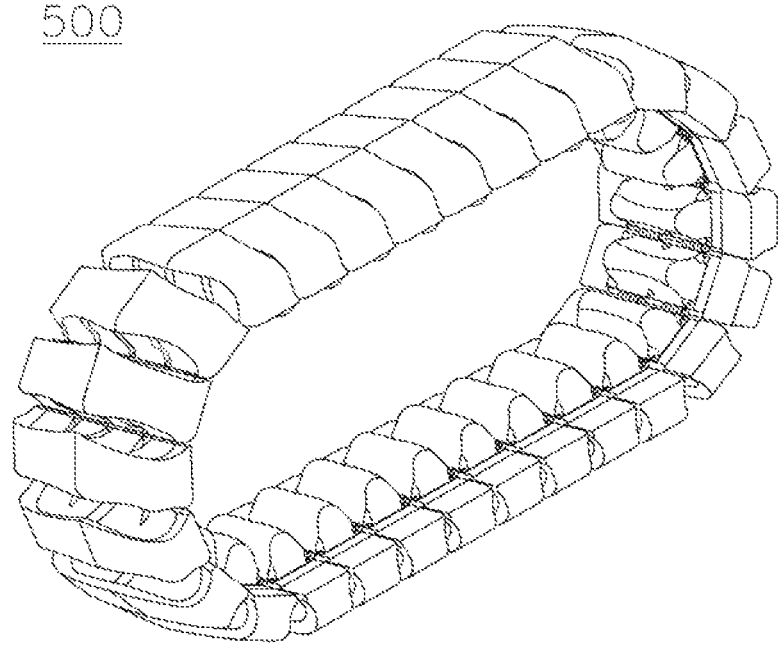
FIG. 2 is a perspective view of a caterpillar assembled by the caterpillar track shoes of FIG. 1.

Hereinbelow, the embodiments of the present invention will be described in detail with reference to the accompanying drawings in order to allow those skilled in the art to more clearly comprehend the present invention. The present invention may, however, be embodied in many different forms and should not be construed as being limited to the embodiments set forth herein. In the drawings, elements not-relevant to the present invention will be omitted in order to clearly describe the present invention, and the same reference numerals refer to similar elements throughout the specification.

It will be understood that the terms "comprising" or "including", when used in this specification, specify the presence of stated features, but do not preclude the presence or addition of one or more other features.

The embodiments of the present invention will now be described with reference to FIGS. 3 to 9.

Figure 3:
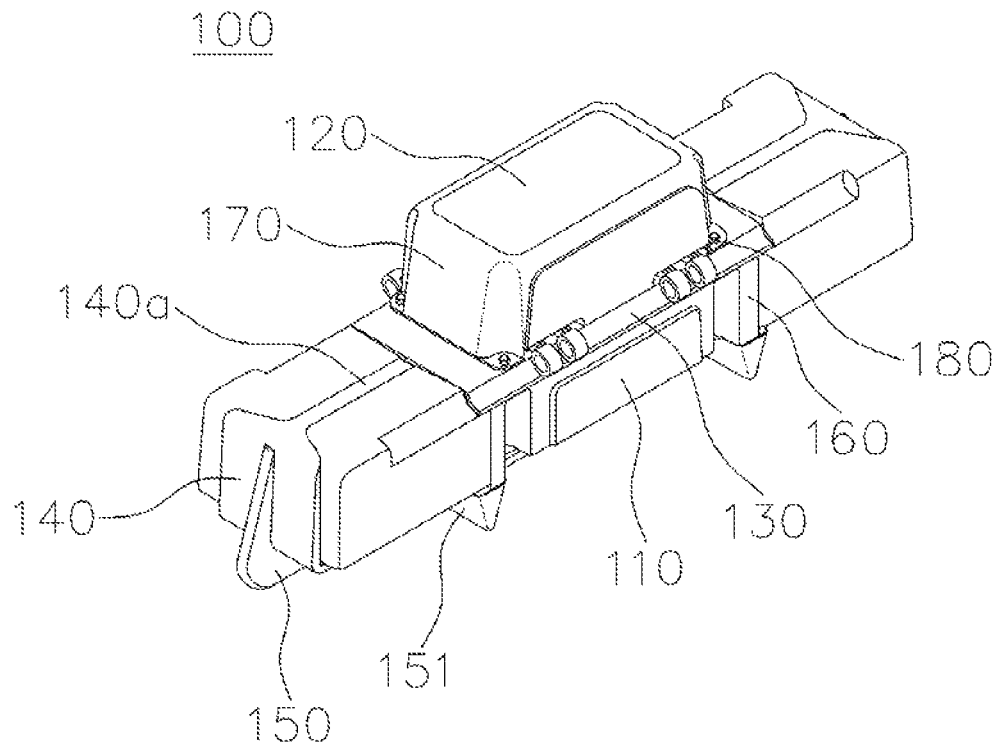
FIG. 3 is a perspective view of an amphibious caterpillar track shoe according to an embodiment of the present invention.
Figure 4:
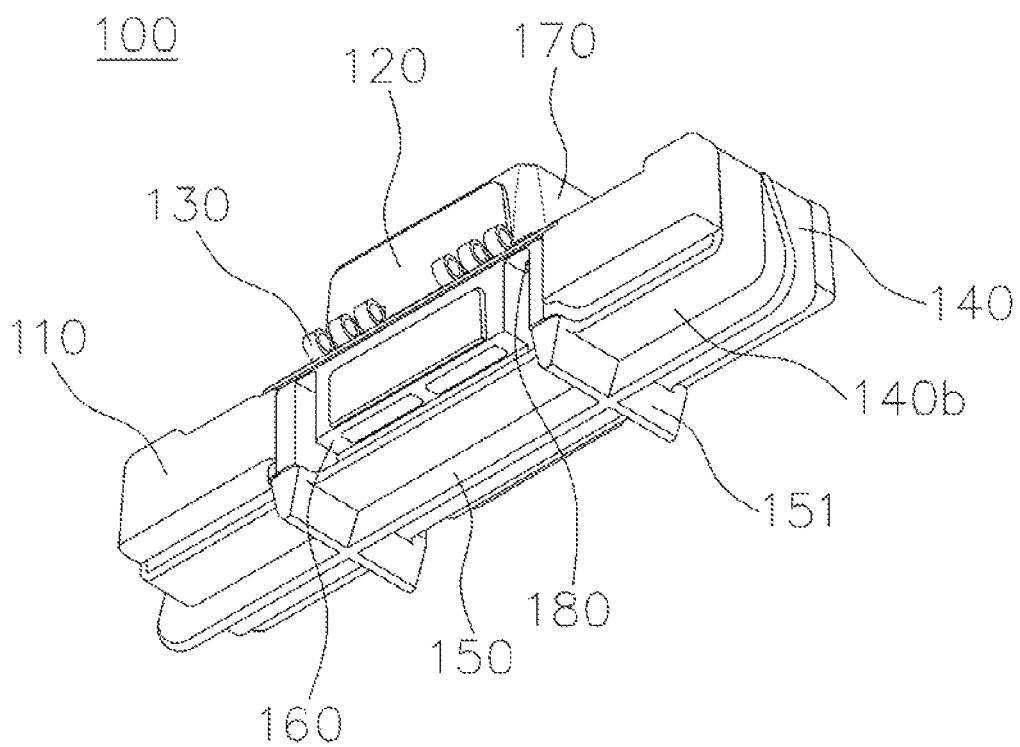
FIG. 4 is a bottom-side perspective view of the amphibious caterpillar track shoe of FIG. 3.
Figure 5:
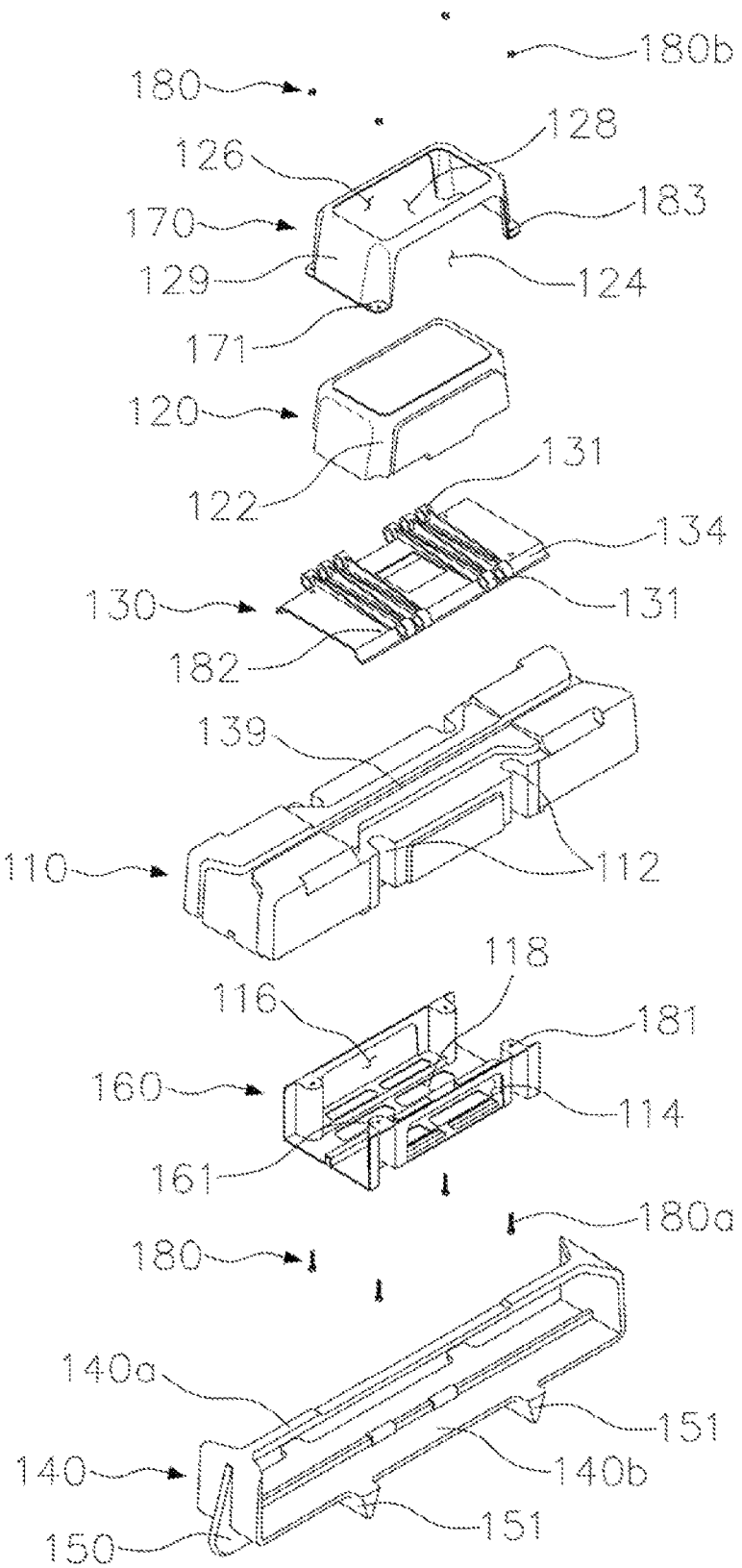
FIG. 5 is an exploded perspective view of the amphibious caterpillar track shoe of FIG. 3.
Figure 6:
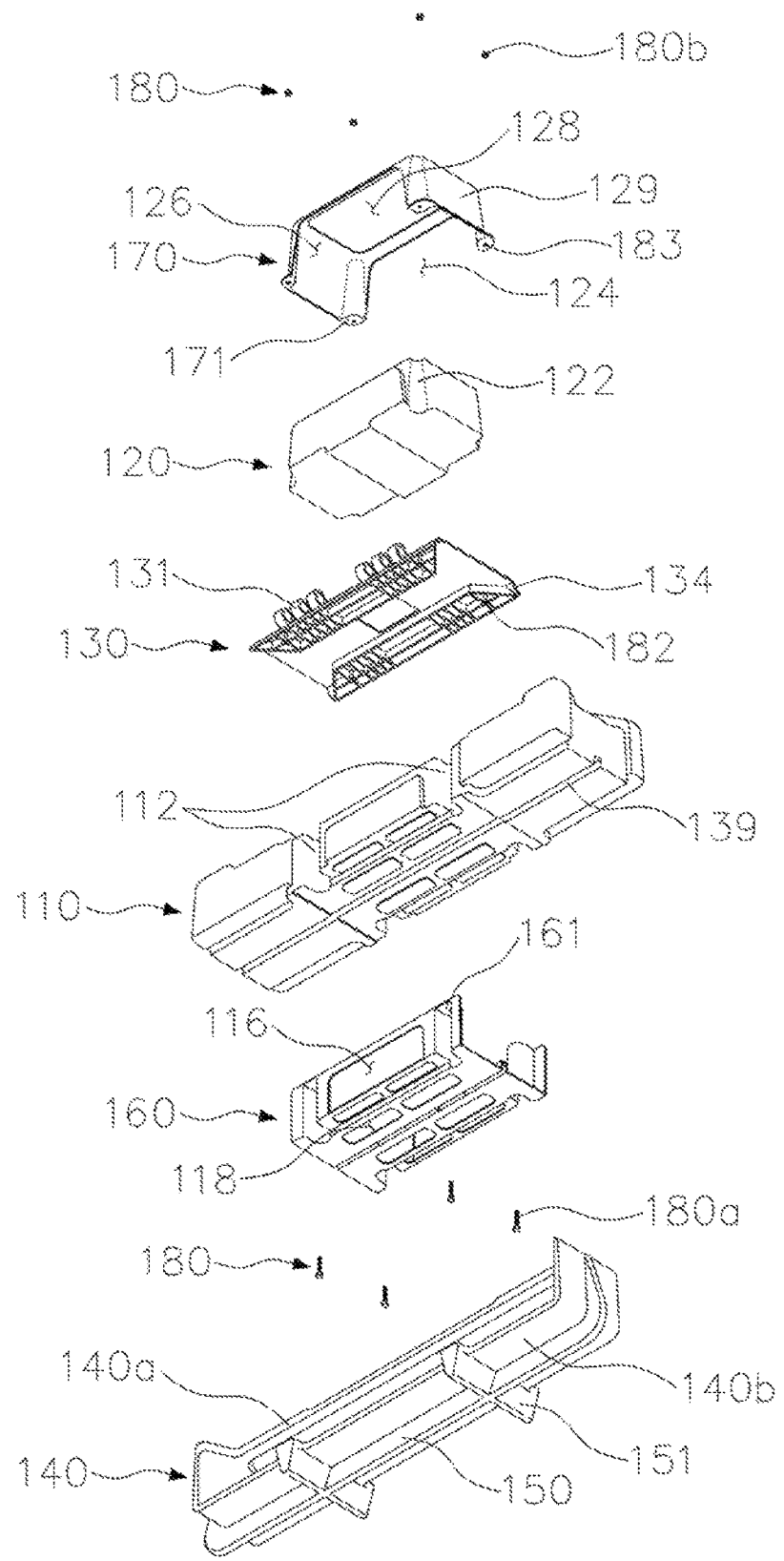
FIG. 6 is an exploded bottom-side perspective view of the amphibious caterpillar track shoe of FIG. 3.
Figure 7:
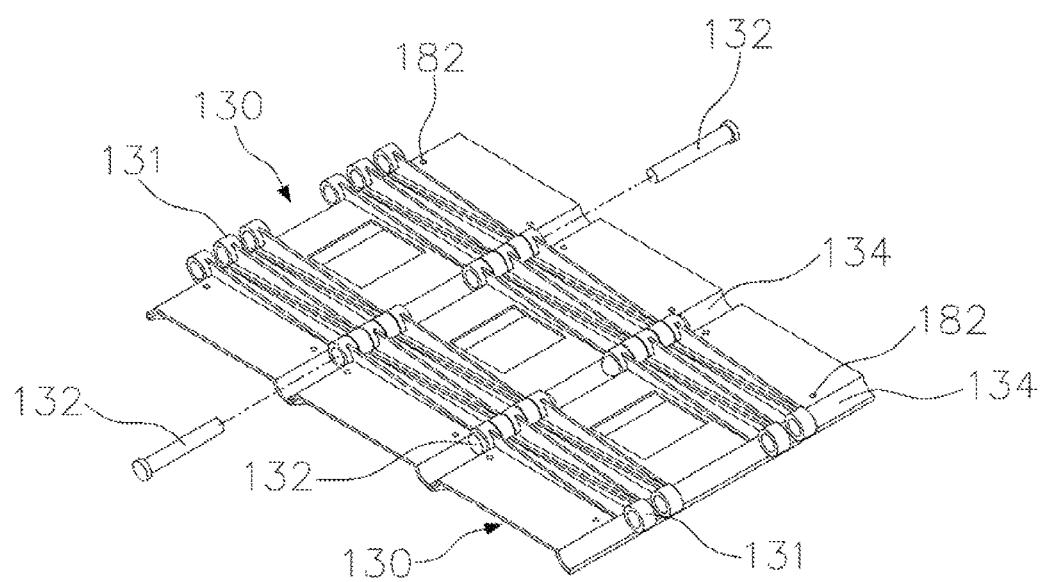
FIG. 7 is a perspective view illustrating a connection plate of FIG. 3 connected to another connection plate.
Figure 8:
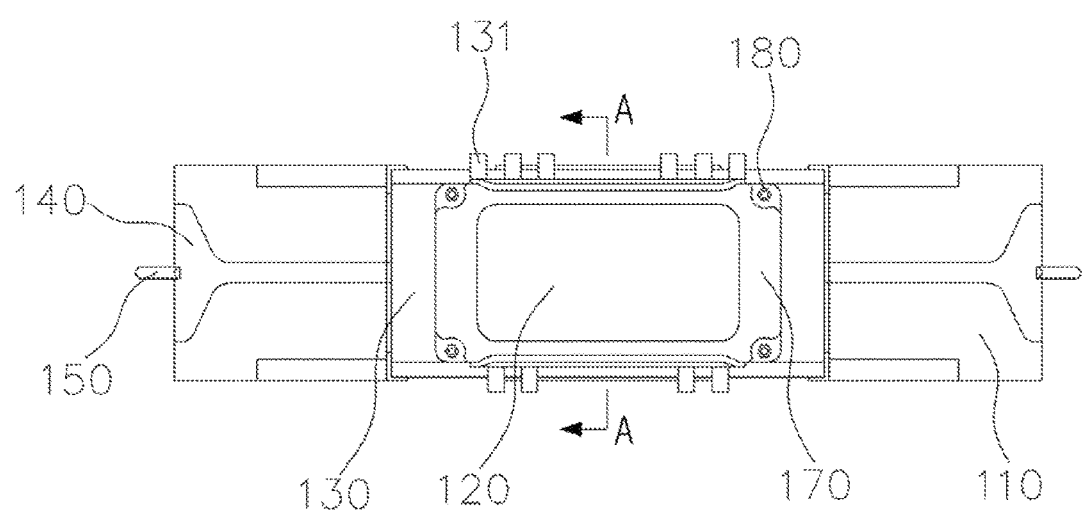
FIG. 8 is a plan view of the amphibious caterpillar track shoe of FIG. 3.
Figure 9:
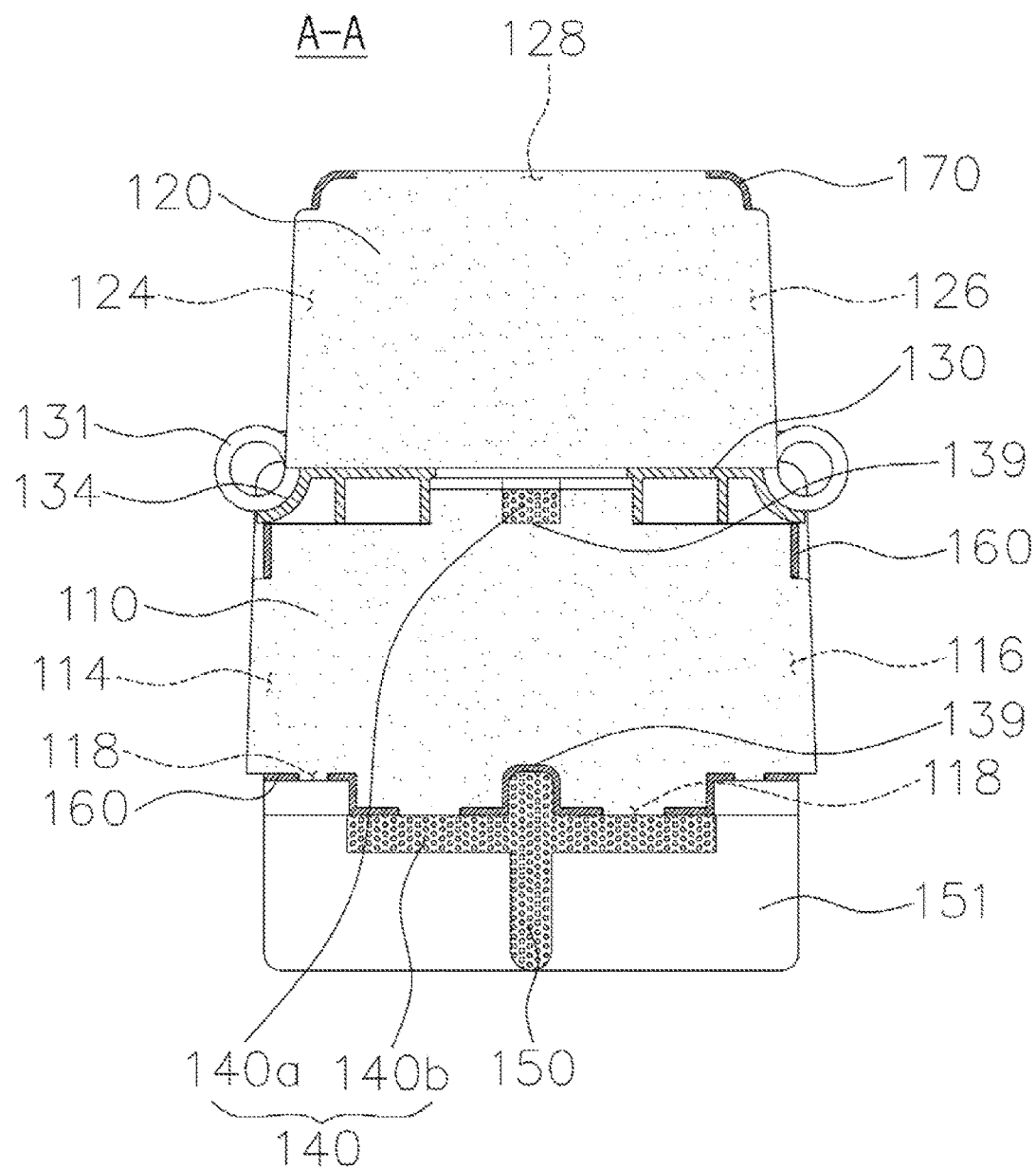
FIG. 9 is a cross-sectional view taken along line A-A of FIG. 8.

FIG. 3 is a perspective view of an amphibious caterpillar track shoe according to an embodiment of the present invention, FIG. 4 is a bottom-side perspective view of the amphibious caterpillar track shoe of FIG. 3, FIG. 5 is an exploded perspective view of the amphibious caterpillar track shoe of FIG. 3, FIG. 6 is an exploded bottom-side perspective view of the amphibious caterpillar track shoe of FIG. 3, FIG. 7 is a perspective view illustrating a connection plate of FIG. 3 connected to another connection plate, FIG. 8 is a plan view of the amphibious caterpillar track shoe of FIG. 3, and FIG. 9 is a cross-sectional view taken along line A-A of FIG. 8.

In the following description, the term "vertical direction" indicates a direction shown with sectional view in FIG. 9, the term "front to back direction" indicates a longitudinal direction of a tracked vehicle that corresponds to a right to left direction of FIG. 9, and the term "width direction" indicates a width direction of the tracked vehicle.

The track shoe 100 is a buoyant track shoe 100 that is buoyant.

The track shoes 100, which were fabricated in a same shape, are chain-connected together to form a caterpillar track.

The track shoe 100 includes a first buoyant section 110, a second buoyant section 120, a connection plate 130, a foam pad 140, a first fixing frame 160, a second fixing frame 170, and a fastening member 180.

The connection plate 130, the first fixing frame 160, and the second fixing frame 170 are formed of a hard plastic material. The first buoyant section 110 and the second buoyant section 120 are foam bodies which are buoyant, and the foam pad 140 is a foam body to absorb shock from the ground.

The first buoyant section 110 is formed of a foam material that is buoyant.

The first buoyant section 110 has a wide-width, short-length hexahedral body,

The first buoyant section 110 has first coupling recesses 112 in front and rear sides thereof, respectively.

Two pairs of the first coupling recesses 112 are provided in the front and rear sides of the first buoyant section 110, respectively, wherein the first coupling recesses 112 in pair are spaced apart from each other.

The first fixing frame 160 is provided to fix the first buoyant section 110.

The first fixing frame 160 is mounted to the first buoyant section 110 by the engagement with the first coupling recesses 112 formed in the first buoyant section 110.

The first fixing frame 160 has a '⌐'-type longitudinal section with a top side and both width sides opened.

The first fixing frame 160 is thus in close contact with the front, rear, and bottom sides of the first buoyant section 110.

The width of the first fixing frame 160 is smaller than that of the first buoyant section 110.

The first fixing frame 160 has a first front opening 114, through which the front side of the first buoyant section 110 is exposed to the outside, a first rear opening 116, through which the rear side of the first buoyant section 110 is exposed to the outside, and a plurality of bottom openings 118, through which the bottom side of the first buoyant section 110 is exposed to the outside. The openings essentially reduce the weight of the first fixing frame 160, contributing to greater buoyancy of the first fixing frame 160.

The first fixing frame 160 is horizontally provided on an upper end thereof with four first support plates 161.

The first support plate 161 of the first fixing frame 160 is provided with a first circular through-hole 181 for bolt-connection.

Under the first support plate 161, a space is provided to allow a bolt 180a of the fastening member 180 to move vertically through the first through-hole 181 of the first support plate 161.

The first buoyant section 110 is provided in upper and lower surfaces thereof with widthwise grooves, respectively, which cross the center of the front to back direction of the first buoyant section 110.

Further, the first buoyant section 110 is provided with rectangular grooves in opposite sides thereof.

The grooves formed in the upper and lower surfaces and the opposite sides of the first buoyant section 110 are called pad-coupling grooves 139.

Here, when coupled to the first buoyant section 110, the first fixing frame 160 is in close contact with the pad-coupling groove 139 formed in the lower surface of the first buoyant section 110.

The pad-coupling grooves 139 are connected together to surround the first buoyant section 110.

Using the pad-coupling grooves 139 of the first buoyant section 110, the foam pad 140 is attached to the first buoyant section 110.

The foam pad 140 is coupled to the pad-coupling grooves 139 of the first buoyant section 110 to surround the first buoyant section 110.

The foam pad 140 includes a coupling part 140*a* and a bottom plate part 140*b*.

The coupling part 140*a* of the foam pad 140 has a rectangular ring shape. That is, an upper portion and both sides of the coupling part 140*a* are inserted into and coupled to the pad-coupling grooves 139 formed in the upper surface and the both sides of the first buoyant section 110, and a lower portion of the coupling part 140*a* is insertion-coupled to the pad-coupling groove 139 formed in the lower surface of the first buoyant section 110 and the first fixing frame 160 closely attached to the pad-coupling groove 139.

The bottom plate part 140*b* is formed at the lower portion of the coupling part 140*a*.

The bottom plate part 140*b* horizontally extends to cover the lower surface of the first buoyant section 110.

The width of the bottom plate part 140*b* corresponds to that of the first buoyant section 110, and the front to back length, i.e. the longitudinal length of the bottom plate part 140*b* is shorter than that of the first buoyant section 110.

However, the longitudinal length of a pair of protruding ribs 151 provided on an undersurface of the bottom plate part 140*b* corresponds to that of the first buoyant section 110.

The bottom plate part 140*b* is a foam body to absorb external shocks.

That is, the foam pad 140 protects the track shoe 100 from external shocks when a tracked vehicle moves on land.

On the undersurface of the foam pad 140, a webbed protruding part 150 is provided in addition to the protruding rib 151.

The webbed protruding part 150 protrudes downwards at a first height.

The webbed protruding part 150 centrally extends along a width direction of the bottom plate part 140*b* to opposite sides of the bottom plate part 140*b*.

When the tracked vehicle moves on water, the webbed protruding part 150 pushes out water opposite the moving direction of the tracked vehicle. That is, the webbed protruding part 150 increases the moving speed of the tracked vehicle moving on water using the principle of action and reaction.

The pair of the protruding ribs 151 is spaced apart from each other, and extends perpendicular to the webbed protruding part 150. That is, the protruding ribs 151 extend in the longitudinal direction of the bottom plate part 140*b*.

The protruding rib 151 has a longitudinal section of an inverted triangle in which a width thereof tapers downwards.

The protruding ribs 151 have a second height that is the same as the first height of the webbed protruding part 150.

This is for supporting the webbed protruding part 150 using the protruding ribs 151 during the movement of the tracked vehicle on both water and land.

The connection plate 130 is provided on the upper surface of the first buoyant section 110.

The connection plate 130 has a smaller width that that of the first buoyant section 110, and a corresponding longitudinal length to that of the first buoyant section 110.

The connection plate 130 is provided with second through-holes 182 that correspond to the first through-holes 181 formed in the first support plates 161 of the first fixing frame 160.

The connection plate 130 is provided on front and rear surfaces thereof with a plurality of connection brackets 131.

The connection brackets 131 of the connection plate 130 are alternately arranged with connection brackets 131 of adjacent connection plate 130 to form a single combined connection hole (see FIG. 7) through which a connection member 132 is inserted to couple the adjacent connection plates 130. That is, adjacent track shoes 100 can be assembled using this connection manner.

The front and rear sides of the connection plate 130 are provided with concave guide parts 134.

The concave guide parts 134 serve to restrict the rotary range between adjacent track shoes 100.

When adjacent connection plates 130 are connected, adjacent concave guide parts 134 of the adjacent connection plates 130 form a combined semi-circular longitudinal sectional part.

The semi-circular sectional part formed by the combined concave guide parts 134 is coupled with a track shoe-coupling protrusion for the rotation of the track shoe 100. This was described in the section of background art, so a detailed description thereof will be omitted.

The second buoyant section 120 is provided on an upper surface of the connection plate 130.

The second buoyant section 120 is a foam body which is buoyant.

The second buoyant section 120 is a hexahedral body, wherein a longitudinal length thereof is shorter than that of the first buoyant section 110, and a width thereof is smaller than that of the first buoyant section.

The second buoyant section 120 is provided along an edge portion thereof with second coupling edge grooves 122.

That is, the second coupling edge grooves 122 has edge grooves formed along a circumferential edge portion of an upper surface of the second buoyant section 120, and edge grooves formed along four edge portions extending downwards from the circumferential edge portion.

The second fixing frame 170 is provided to fix the second buoyant section 120.

The second fixing frame 170 is coupled to the second buoyant section 120 through the second coupling edge grooves 122 formed in the second buoyant section 120.

The second fixing frame 170 has a shape like a top-opened inverted rectangular dining table having four legs.

The second fixing frame 170 has a pair of fixing side plate parts 129 to closely cover opposite sides of the second buoyant section 120. That fixing side plate parts 129 serve to fix the second buoyant section 120 as well as to protect the same.

The second fixing frame 170 has front, rear, and upper openings 124, 126, and 128, through which the front, rear, and upper surfaces of the second buoyant section 120 are exposed to the outside, respectively. The openings reduce the weight of the second fixing frame 170 and increase the space occupation of the second buoyant section 120, thereby contributing to the generation of buoyancy.

The second fixing frame 170 is horizontally provided on four lower corners thereof with second support plates 171 that correspond to the first support plates 161 of the first fixing frame 160.

The second support plates 171 of the second fixing frame 170 are provided with third circular through-holes 183 for bolt-connection.

The third through-holes 183 are provided to correspond to the first and second through-holes 181 and 182.

Above the second support plate 171, a space is provided to allow a nut 180b of the fastening member 180 to move vertically through the third through-hole 183 of the second support plate 171.

The fastening member 180 is a member to connect the first fixing frame 160, the connection plate 130, and the second fixing frame 170.

In the present embodiment, a bolt 180a and a nut 180b are provided for a bolt-nut connection as the fastening member 180.

The first through-hole 181 of the first support plate 161, the second through-hole 182 of the connection plate 130, and the third through-hole 183 of the second support plate 171 are provided to correspond to each other.

That is, when the first support plate 161 of the first fixing frame 160, the connection plate 130, and the second support plate 171 of the second fixing frame 170 are brought into close contact with each other, the first, second, and third through-holes 181, 182, and 183 are aligned with each other.

When the bolt 180a of the fastening member 180, which was threaded through the first, second, and third through-holes 181, 182, and 183, is fastened by the nut 180b, the first support plate 161 of the first fixing frame 160, and the second support plate 171 of the second fixing frame 170 are prevented from being detached from the connection plate 130.

Further, the first buoyant section 110 attached to the first fixing frame 160, and the second buoyant section 120 attached to the second fixing frame 170 are prevented from being detached from the connection plate 130.

Another embodiment of the present invention will now be described.

Figure 10:
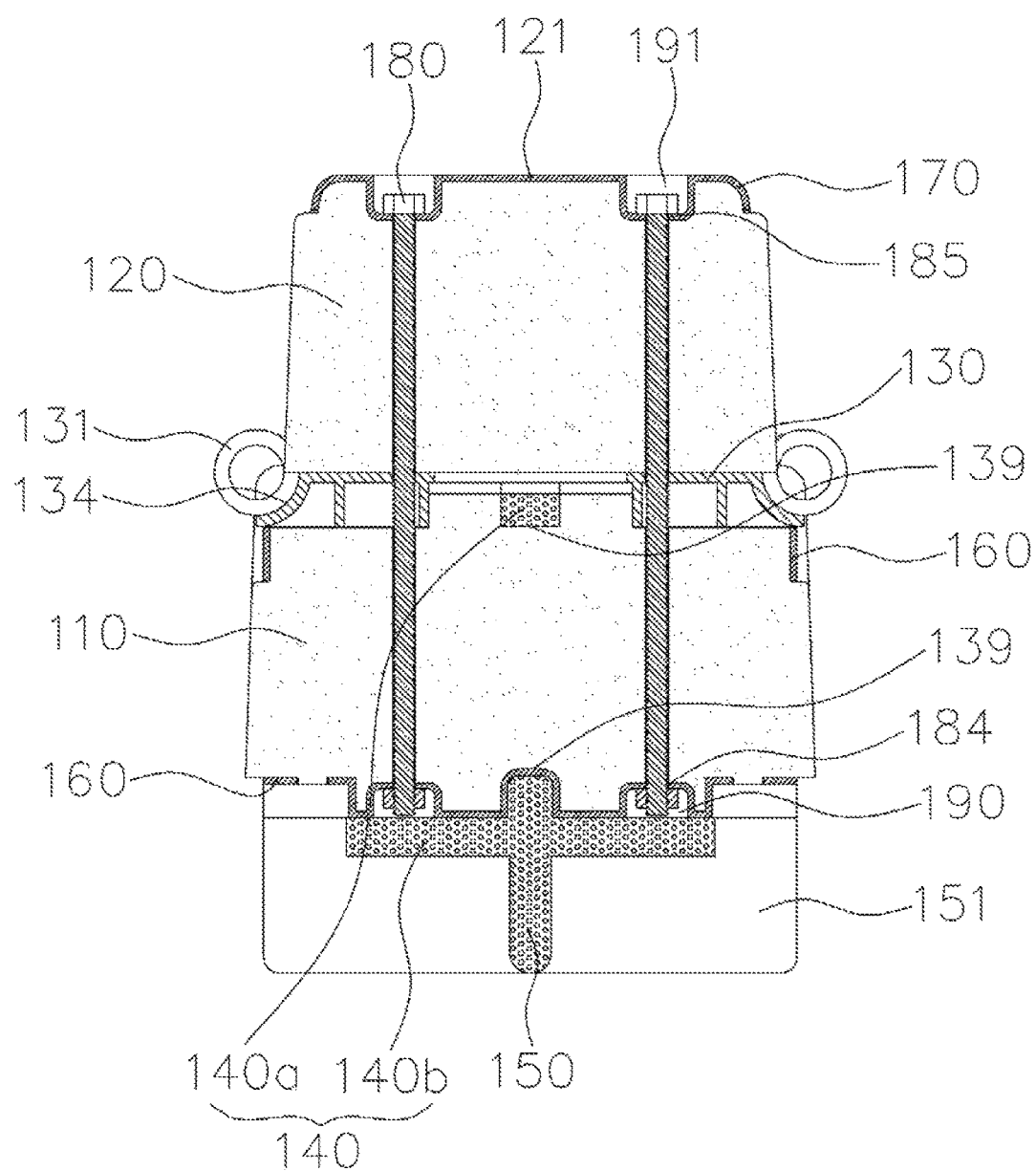
FIG. 10 is a cross-sectional view of an amphibious caterpillar track shoe according to another embodiment, which is similar to FIG. 9.

FIG. 10 is a cross-sectional view of an amphibious caterpillar track shoe according to another embodiment, which is similar to FIG. 9.

The present embodiment illustrates another fastening method using the fastening member 180.

The second fixing frame 170 provided on the second buoyant section 120 includes a fixing upper plate 121 that closely cover the upper surface of the second buoyant section 120.

The first buoyant section 110 is provided in a lower surface thereof with a pair of first connection recesses 190.

The first connection recesses 190 of the first buoyant section 110 are spaced apart from each other.

The first fixing frame 160 closely covers the pair of first connection recesses 190.

The first fixing frame 160 closely covering the pair of first connection recesses 190 is provided with a fourth through-hole 184 for bolt-connection.

The fixing upper plate 121 of the second buoyant section 120 is provided on an upper surface thereof with second connection recesses 191.

The first and second connection recesses 190 and 191 are provided to correspond to each other.

The first and second connection recesses 190 and 191 are provided in order to prevent the bolt 180a and the nut 180b from interfering with other elements when the bolt 180a and the nut 180b of the fastening member 180 are bolt-connected.

The fixing upper plate 121 of the second fixing frame 170 closely covers the second connection recesses 191.

The second fixing frame 170 closely covering the second connection recesses 191 is provided with a fifth through-hole 185 for bolt-connection.

The fourth through-hole 184 of the first connection recess 190 and the fifth through-hole 185 of the second connection recess 191 are connected through the first buoyant section 110, the connection plate 130, and the second buoyant section 120.

Here, the bolt 180a and the nut 180b are fastened together through the connected fourth and fifth through-holes 184 and 185.

Thus, such bolt-connection prevents the detachment of the first and second fixing frames 160 and 170 from the connection plate 130.

Further, the first buoyant section 110 attached to the first fixing frame 160 and the second buoyant section 120 attached to the second fixing frame 170 are prevented from being detached from the connection plate 130.

This means the first and second fixing frames 160 and 170 can be coupled without the first support plate 161 of the first fixing frame 160 and the second support plate 171 of the second fixing frame 170.

Although a preferred embodiment of the present invention has been described for illustrative purposes, those skilled in the art will appreciate that various modifications, additions and substitutions are possible, without departing from the scope and spirit of the invention. Therefore, it should be construed that the described embodiments are merely illustrative in all aspects and are not limiting. For example, elements described as an integrated configuration may be implemented as individual elements and vice versa.

The scope of the present invention is defined by the following claims rather than the detailed description, changes or modifications drawn from the spirit and scope of claims and equivalents thereof should be construed as being included in the scope of the invention.

INDUSTRIAL APPLICABILITY

The present invention can be used as an amphibious caterpillar track shoe.

The invention claimed is:

1. An amphibious caterpillar track shoe comprising:
a first buoyant section having a hexahedral buoyant foam body with a wide width and a short length, the first buoyant section having pad-coupling recesses in an upper surface, a lower surface, and opposite sides thereof;
a first fixing frame provided in close contact with front, rear, and bottom surfaces of the first buoyant section to fix the first buoyant section, wherein a width thereof is smaller than that of the first buoyant section;
a foam pad having a rectangular ring-type coupling part fixedly inserted into the pad-coupling recess of the first buoyant section, a bottom plate part formed at a lower portion of the coupling part, and a webbed protruding part formed downwards on an undersurface of the bottom plate part, extending in a width direction of the bottom plate part;
a connection plate provided on the upper surface of the first buoyant section and having on front and rear surfaces thereof connection brackets to couple an adjacent connection plate, wherein a width thereof is smaller than that of the first buoyant section, and a longitudinal length thereof corresponds to that of the first buoyant section;

a second buoyant section provided on an upper surface of the connection plate and having a hexahedral buoyant foam body, wherein a width thereof is smaller than that of the first buoyant section;

a second fixing frame provided to fix the second buoyant section and having a pair of fixing side plate parts closely contacting and covering the opposite sides of the second buoyant section, and a connection part connecting the pair of fixing side plate parts, wherein the second fixing frame is provided with front and rear openings through which the front and rear surfaces of the second buoyant section are exposed to the outside, respectively; and a fastening member fastening the first and second fixing frames to the connection plate.

2. The amphibious caterpillar track shoe of claim 1, wherein a first support plate is provided on an upper portion of the first fixing frame, a second support plate is provided on a lower portion of the second fixing frame, the fastening member fastens the first and second fixing frames to the connection plate through the second support plate, the connection plate, and the first support plate, and the second fixing frame is provided with an upper opening through which an upper surface of the second buoyant section is exposed to the outside.

3. The amphibious caterpillar track shoe of claim 1, wherein the second fixing frame is provided with a fixing upper plate to cover an upper surface of the second buoyant section, and the fastening member fastens the first and second fixing frames to the connection plate through an upper surface of the fixing upper plate of the second fixing frame, the connection plate, and a lower surface of the first fixing frame.

4. The amphibious caterpillar track shoe of claim 1, wherein the bottom plate part of the foam pad is further provided with a protruding rib formed downwards on the undersurface of the bottom plate part, extending perpendicular to the webbed protruding part.

* * * * *